United States Patent [19]

Vinciguerra et al.

[11] Patent Number: 5,291,970
[45] Date of Patent: Mar. 8, 1994

[54] ENTRAINMENT PUMP FOR VISCOUS FLUIDS, PARTICULARLY SUITABLE FOR LUBRICATING DOBBIES AND LOOMS

[75] Inventors: Costantino Vinciguerra, Florence; Andrea Brocchini, Scandicci, both of Italy

[73] Assignee: Nuoyopignone-Industrie Meccaneche e Fonderia SpA, Milan, Italy

[21] Appl. No.: 945,022

[22] Filed: Sep. 15, 1992

[30] Foreign Application Priority Data

Sep. 20, 1991 [IT] Italy .................. MI91 A 002516

[51] Int. Cl.⁵ ............................................. F01M 1/00
[52] U.S. Cl. ................................ 184/11.2; 184/11.1;
184/11.4; 184/61; 139/1 R
[58] Field of Search .................. 184/6.19, 11.1, 11.2,
184/11.4, 65, 62, 61; 139/1 R

[56] References Cited

U.S. PATENT DOCUMENTS 1,964,551  6/1934  Anderson ........................ 184/6.19
2,300,973  11/1942  Rogers ............................ 184/11.1

FOREIGN PATENT DOCUMENTS 720485  7/1942  Fed. Rep. of Germany .
931629  2/1948  France ............................ 184/11.2
0152953  1/1956  Sweden .......................... 184/11.2

*Primary Examiner*—Thomas E. Denion
*Attorney, Agent, or Firm*—Morgan & Finnegan

[57] ABSTRACT

An entrainment pump for viscous fluids comprising a moving member which dips into the fluid and of which a flat wall cooperates, without contact but with a very small clearance, with seals provides on the sides and at the rear end of a static element consisting of a box guide elongate in the direction of movement of said moving member, in this guide there being provided successive trap chambers which with said moving flat wall form clearances progressively decreasing in the direction of said movement and of the same order of magnitude as the particular thickness of the dragged fluid. Preferred embodiments are also provided.

5 Claims, 2 Drawing Sheets

ENTRAINMENT PUMP FOR VISCOUS FLUIDS, PARTICULARLY SUITABLE FOR LUBRICATING DOBBIES AND LOOMS

BACKGROUND OF THE INVENTION

1. Field of the Invention

This invention relates to a new entrainment pump for viscous fluids which, by utilizing the dragging action of a moving member dipping into the fluid, said moving member possibly being a component of the actual apparatus in which the pump is to act, achieves effective and reliable pumping by means of a simple static element of low cost and minimum overall size.

2. Description of the Prior Art

In the known art, to pump viscous fluids such as those used in lubricating the crank arms of rotary dobbies and looms, use is generally made of gear or lobe pumps in which two rotating members expel the fluid to be pumped between them.

Said known entrainment pumps have however a series of drawbacks which make them costly, difficult to assemble and in particular bulky, this latter drawback being very important especially in the field of dobbies in which, as is well known, the available spaces are truly minimal. In this respect, such mechanical pumps require a drive which is generally distant from the points to be lubricated, so that said points have to be connected along complicated paths by long and unwieldy connection tubes. In addition to precision manufacture they also require bulky couplings for connecting the pump to said drive, this further increasing costs.

SUMMARY OF THE INVENTION

The object of the present invention is to obviate the aforesaid drawbacks by providing an entrainment pump which combines small overall size and very low cost with effective and reliable pumping and simple installation.

This object is substantially attained by using a flat wall of a moving member dipping into the actual viscous fluid as the dragging member for conveying said fluid into a static element consisting of a box guide which is elongate in the direction of motion of said moving member and in which successive trap-chambers are provided forming progressively decreasing clearances with said moving flat wall which upperly closes said box guide via a seal, said clearances being of the same order of magnitude as the particular thickness of the dragged fluid.

In this manner, as the moving member which dips into the fluid can be any moving component of the apparatus in which the pump is to act, the pump is reduced substantially to merely the static element which, besides being of low cost, is of such small overall size as to allow it to be applied in any narrow region. For example, in the specific case of a rotary dobby, if the modulator is used as the dipping moving member the pump can be applied in the immediate vicinity of the crank arms to be lubricated, with evident connection and installation simplification. Again, as there is no sliding contact such a pump undergoes substantially no wear and can therefore be constructed of plastics material leading to further cost reduction. In addition as the particular clearances and trap chambers prevent any possibility of return of the fluid dragged by the flat wall of the moving member, they ensure effective conversion of the fluid kinetic energy into pressure, with the consequent achieving of heads of the order of 5-10 meters, as experimental tests have demonstrated.

Hence, the entrainment pump for viscous fluids, particularly suitable for lubricating dobbies and looms, is characterised according to the present invention by comprising a flat wall of a moving member dipping into the said viscous fluid, against which wall there cooperates, without contact but with extremely small clearances, a static element consisting of a fluid guide of box form which is elongate in the direction of motion of said moving flat wall, is open at its front end, and is provided on its sides and on its read end, comprising a discharge port, with seals arranged to cooperate with said moving flat wall, within said guide there being provided successive trap chambers which with said moving flat wall form clearances progressively decreasing in the direction of said movement and of the same order of magnitude as the particular thickness of the dragged fluid.

According to a preferred embodiment of the present invention, each of said trap chambers forms its own clearance with said moving flat wall via its front end, which is in the form of a beak pointing in the direction of movement of said moving flat wall and from which there extends a substantially cylindrical cavity which degrades towards the beak end of the next trap chamber in the direction of movement.

In this manner the particular beak shape in no way hinders the flow of dragged fluid and instead by acting as a scraper opposes its return flow, while the cylindrical cavity favours the formation of a vortex movement of any fluid which flows back into the chamber, this movement resulting in total prevention of return fluid flow.

Finally, according to a further preferred embodiment of the present invention, said seals provided on the sides and on the rear end of said box guide are labyrinth seals.

The invention is described in detail hereinafter with reference to the accompanying drawings, which illustrate a preferred embodiment thereof in the rotary dobby field, given by way of non-limiting example in that technical, constructional or applicational modifications can be made thereto but without leaving the scope of the present invention.

DESCRIPTION OF THE PREFERRED EMBODIMENT(S)

Figure 1:
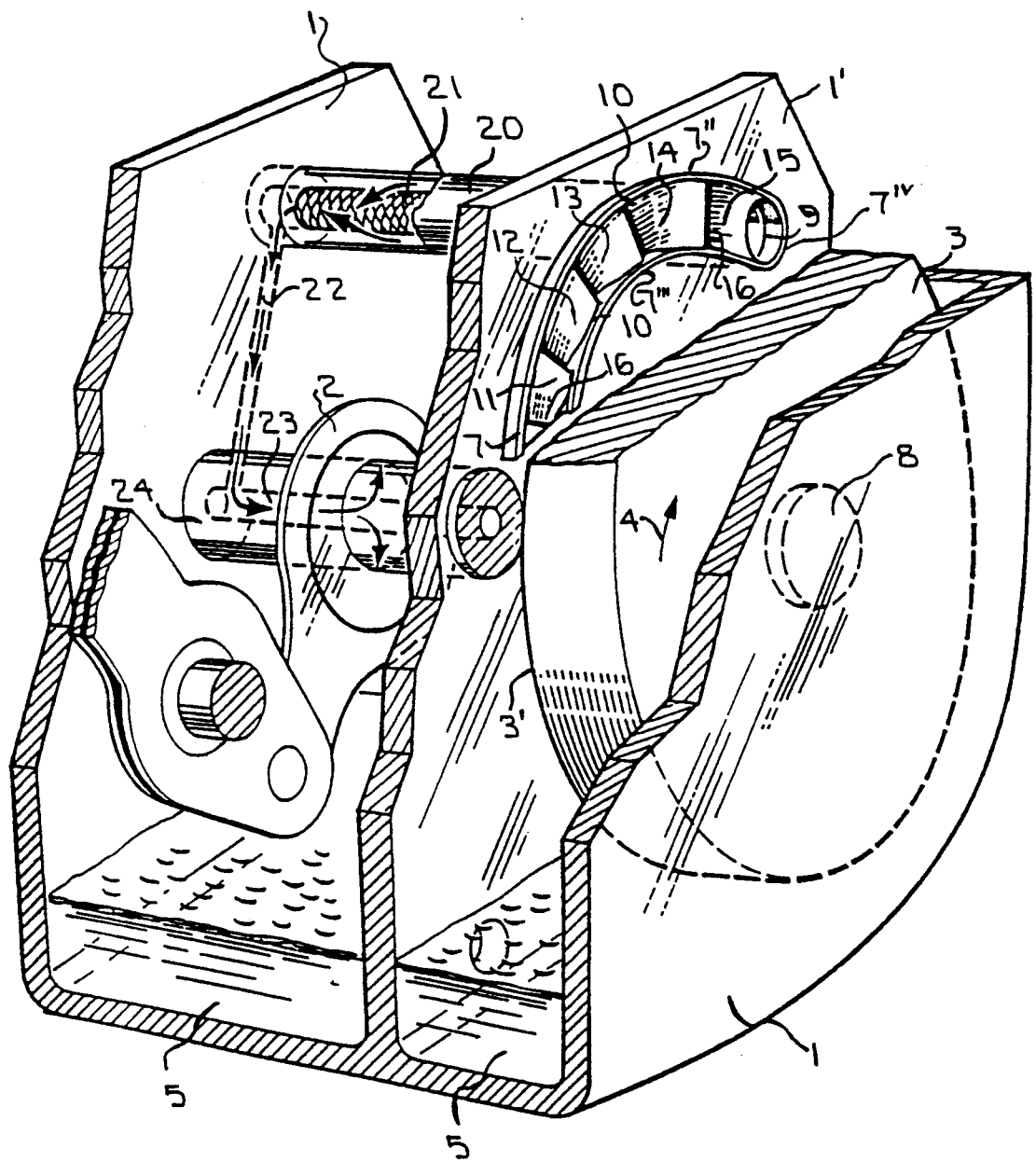
FIG. 1 is a partly sectional partial perspective view of a rotary dobby using an entrainment pump according to the invention for its lubrication.
Figure 2:
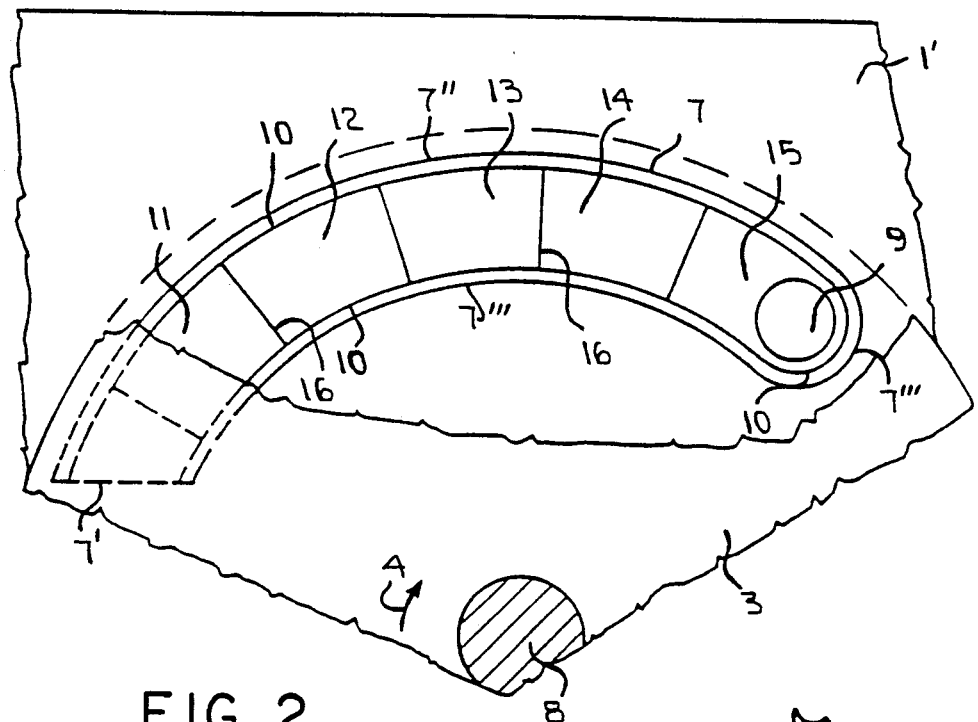
FIG. 2 is a partial front view of the pump region of FIG. 1 to an enlarged scale.

In the figures the reference numeral 1 indicates the body of a rotary dobby, 2 the main crank arms to be lubricated directly (the figures show only one main crank arm for reasons of clarity) and 3 the modulator which in rotating in the direction of the arrow 4 dips into and drags with it the lubricating fluid 5.

Figure 3:
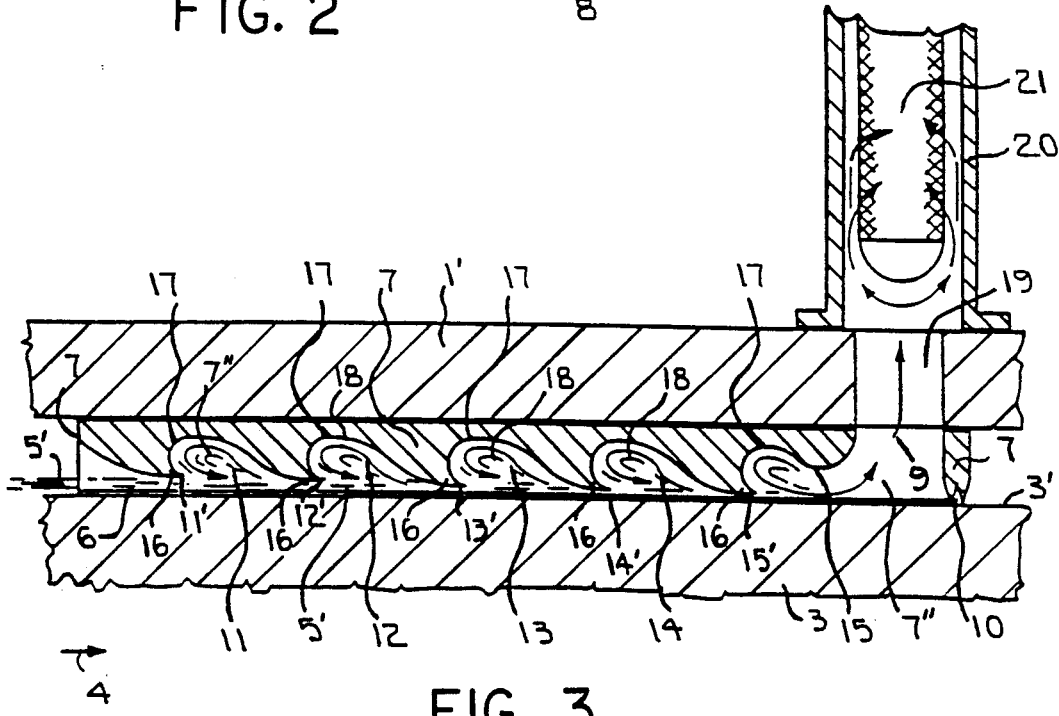
FIG. 3 is a section through FIG. 2 from above.

The flat wall 3' (see specifically FIG. 3) of said modulator 3 is made to cooperate, without contact but with a very small clearance 6, with a static guide 7 which is fixed to the wall 1' of the dobby body 1 and constitutes substantially the entrainment pump of the invention.

Said guide 7 is of box form elongate in the direction of movement of the moving flat wall 3', and hence in the present case is of curvilinear form with its centre on the axis 8 of rotation of the modulator 3, in order not to disturb the travel of the fluid threads 5' dragged by said moving flat wall 3' into said guide 7 through the front end 7' of this latter, which is open. The guide 7 is also provided on its side walls 7" and 7''' and on its rear end 7$^i$, comprising a discharge port 9, with labyrinth seals 10 arranged to cooperate with said moving flat wall 3', and comprises in its interior successive trap chambers, 11, 12, 13, 14 and 15 respectively, which between the moving flat wall 3' and their front beak-shaped ends 16 form clearances, 11', ... 15' respectively, which progressively decrease in the direction of movement 4 and are of the same order of magnitude as the particular thickness of the dragged fluid 5', which as is well known depends substantially on the type of fluid used and the temperature present. As is well known, friction heat in the lubricant is one source of heat to vary the thickness of the dragged fluid 5' (c.f. *Chemical Engineers' Handbook*, R. H. Perry et al., McGraw-Hill Book Company, New York, Fourth Edition, 1963, pp. 24–82 et seq.) The thickness of a film of fluid that adheres to a moving flat wall is a function of the viscosity of the fluid and the adhesion or "wetting" characteristic of the fluid and the moving wall. These variables are a function not only of the specific fluid under consideration, but also, for any given fluid, the temperature of that fluid. The clearance for the first trap-chamber is equal to the oil film thickness, a value that is completely empirical in character, in that it must be developed through a series of tests for specific fluids. It has been found through experimentation that satisfactory balance is reached with the clearance of the last trap-chamber being about half of the clearance of the initial trap-chamber with a linear reduction of the intermediate trap-chamber clearances. Finally the beak of said front ends 16 of said trap chambers points in the direction of movement 4' (see specifically FIG. 3) in order not to hinder the flow of the fluid 5', and from the beak there extends a substantially cylindrical cavity 17 which degrades towards the beak-shaped end 16 of the next trap chamber in said direction of movement 4, its purpose being to create vortex motion 18 which bars the return flow of the fluid.

The fluid pumped in this manner towards the port 9 is conveyed, via a corresponding port 19 in the wall 1', into a duct 20 which also acts as a spacer and support for the dobby walls and in which there is inserted a filter 21 via which the fluid is conveyed through a duct 22 and into a central bore 23 in the dobby drive shaft 24, from which it is urged by centrifugal force through suitable holes, to lubricate the main crank arms 2.

We claim:

1. An entrainment pump for viscous fluids, for lubricating dobbies and looms apparatus, characterized by comprising a flat wall of a member for movement in a predetermined direction for dipping into the viscous fluid, against which wall there cooperates, without contact but with extremely small clearances, a static element having a fluid guide of box form which is elongate in the direction of motion of said moving flat wall, said static element being open at one end, and provided on its sides and on another end with a discharge port, seals arranged to cooperate with said flat wall, within said guide there being provided successive trap chambers which with said flat wall forms clearances progressively decreasing in said predetermined movement direction in accordance with the thickness of the viscous fluid thereunder.

2. An entrainment pump for viscous fluids as claimed in claim 1, characterised in that each of said trap chambers forms its own clearance with said moving flat wall via its front end, which is in the form of a beak pointing in the direction of movement of said moving flat wall and from which there extends a substantially cylindrical cavity which degrades towards a beak end of the next trap chamber in the direction of movement.

3. An entrainment pump for viscous fluids as claimed in claim 1, characterized in the said member for moving in a predetermined direction which dips into the viscous fluid and cooperates with said box guide is a component of the apparatus.

4. An entrainment pump for viscous fluids as claimed in claim 1, characterised by being constructed of plastics material.

5. An entrainment pump for viscous fluids as claimed in claim 1, characterised in that said seals are labyrinth seals.

* * * * *

UNITED STATES PATENT AND TRADEMARK OFFICE
CERTIFICATE OF CORRECTION

PATENT NO. : 5,291,970
DATED : March 8, 1994
INVENTOR(S) : Vinciguerra et al.

It is certified that error appears in the above-identified patent and that said Letters Patent is hereby corrected as shown below:

On title page, delete item [73]

"Nuoyopignone-Industrie Meccaneche e Fonderia SpA, Milan, Italy" and insert

--Nuovopignone-Industrie Meccaniche e Fonderia S.p.A., Milan, Italy--.

Signed and Sealed this

Twenty-ninth Day of August, 1995

*Attest:*

BRUCE LEHMAN

*Attesting Officer*     *Commissioner of Patents and Trademarks*